April 18, 1939.　　　P. M. HALL　　　2,154,935
WELDING MACHINE
Filed May 17, 1937　　3 Sheets-Sheet 1
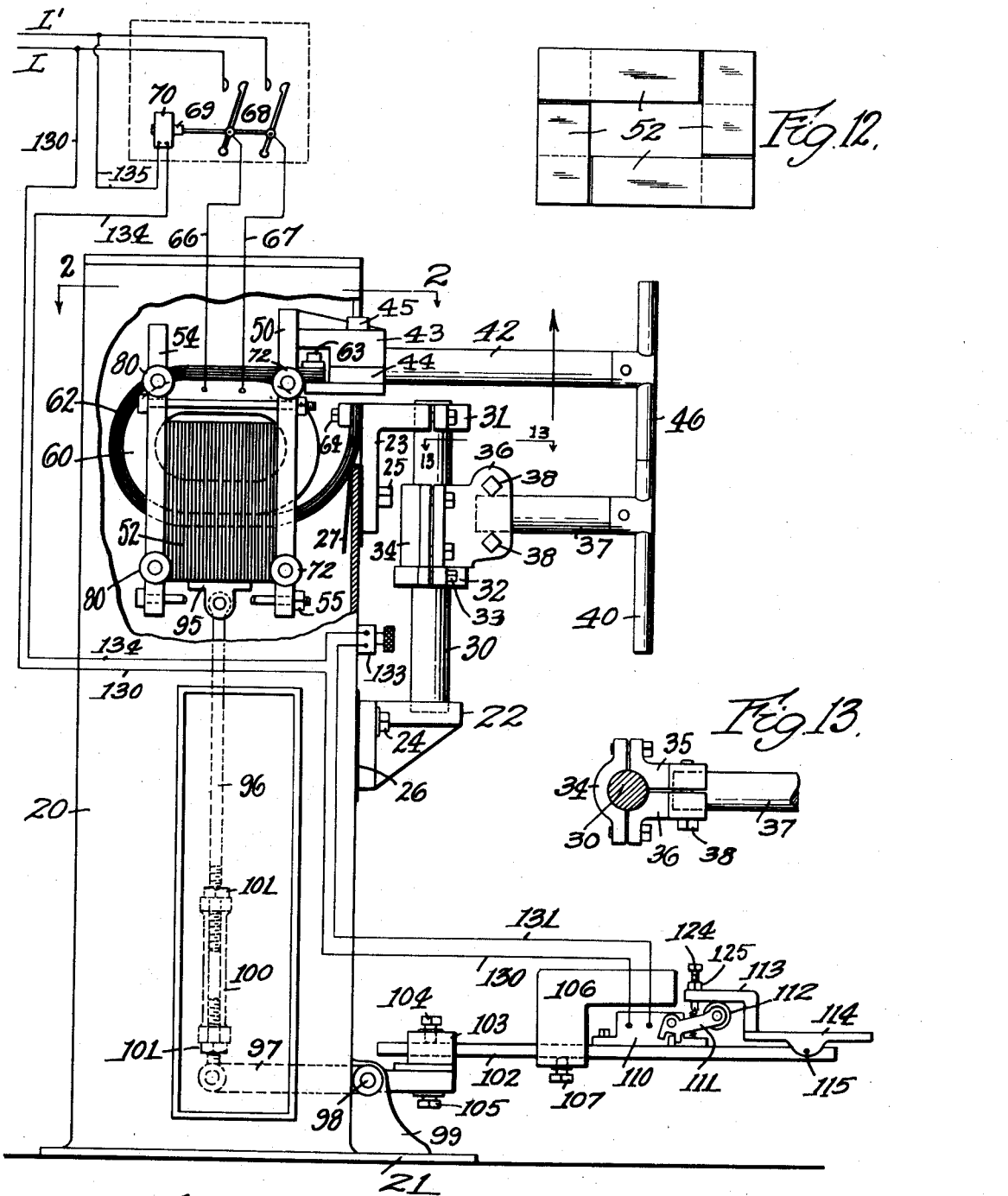

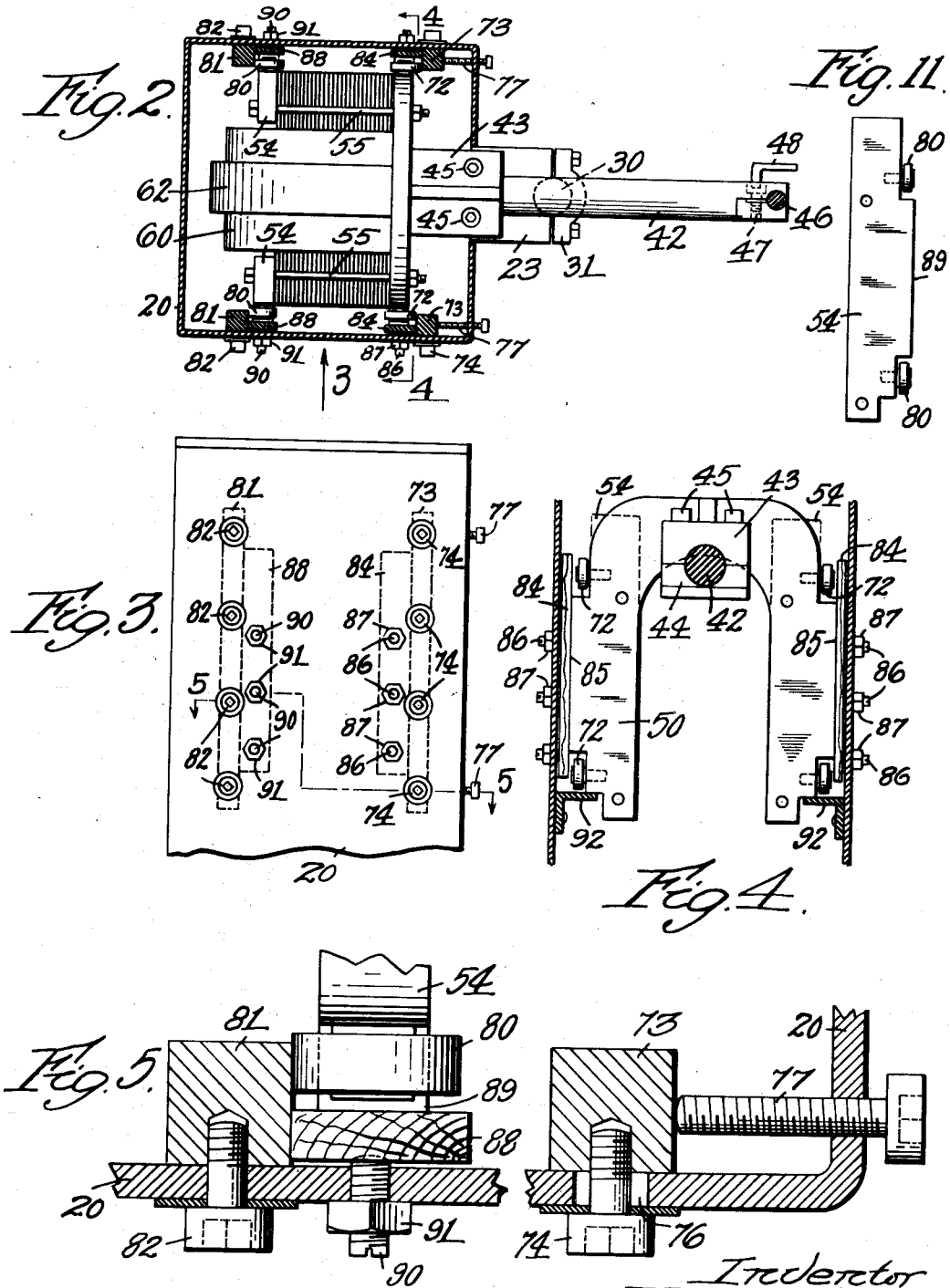

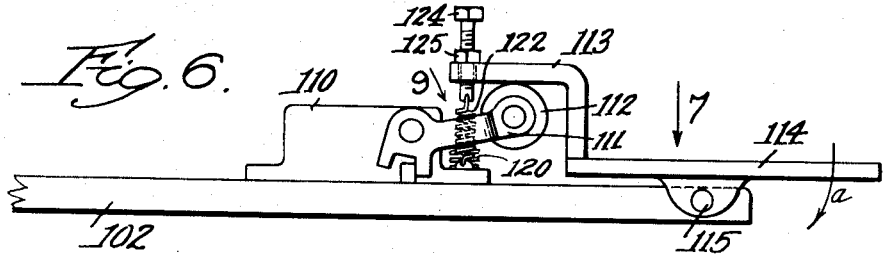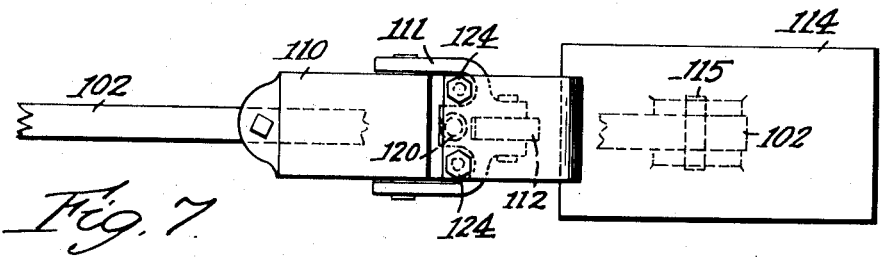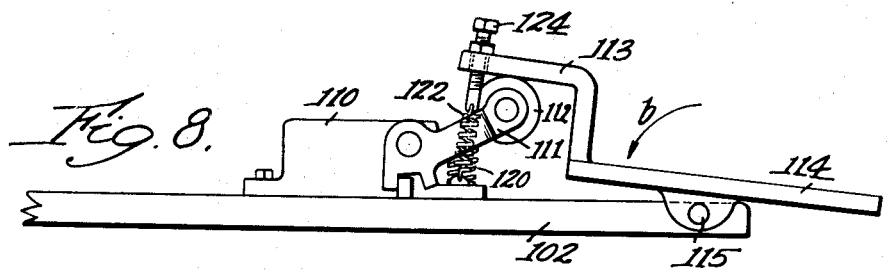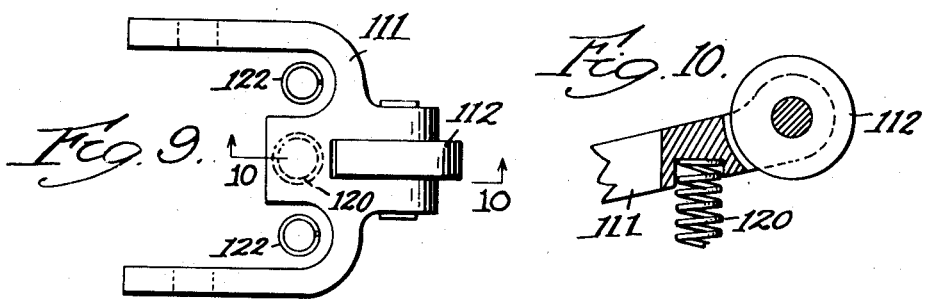

Patented Apr. 18, 1939

2,154,935

UNITED STATES PATENT OFFICE 2,154,935

WELDING MACHINE

Preston M. Hall, Worcester, Mass.

Application May 17, 1937, Serial No. 142,965

5 Claims. (Cl. 219—4)

This invention relates to a machine of the foot-controlled type and is particularly designed for spot or resistance welding.

It is the general object of my invention to improve the construction of such welding machines, to the end that they may be more easily operated and may be more reliable and satisfactory in use.

To the attainment of this general object, an important feature of my invention relates to the provision in a welding machine of a movable welding horn having a straight line path of approach to the fixed horn. Another important feature of the invention relates to the provision of a welding machine in which the weight of the transformer and upper horn assembly is utilized to produce the welding pressure. Improved methods of operation are made possible by my improved construction.

My invention further relates to arrangements and combinations of parts which will be hereinafter described and more particularly pointed out in the appended claims.

A preferred form of the invention is shown in the drawings, in which

Fig. 1 is a side elevation of my improved welding machine, partially broken away to show interior construction;

Fig. 2 is a sectional plan view, taken along the line 2—2 in Fig. 1;

Fig. 3 is a partial side elevation, looking in the direction of the arrow 3 in Fig. 2;

Fig. 4 is a partial sectional front elevation, taken along the line 4—4 in Fig. 2;

Fig. 5 is an enlarged detail sectional plan view, taken along the line 5—5 in Fig. 3;

Fig. 6 is a side elevation of a switch and pedal control used in my improved machine;

Fig. 7 is a plan view, looking in the direction of the arrow 7 in Fig. 6;

Fig. 8 is a view similar to Fig. 6 showing the parts in a different position and differently adjusted;

Fig. 9 is a detail plan view of a switch lever, looking in the direction of the arrow 9 in Fig. 6;

Fig. 10 is a detail sectional side elevation, taken along the line 10—10 in Fig. 9;

Fig. 11 is a side elevation of a back transformer plate;

Fig. 12 is a detail view to be described; and

Fig. 13 is a detail sectional view, taken along the line 13—13 in Fig. 1.

Referring to Figs. 1 and 2, my improved welding machine comprises an upright support 20, preferably of hollow sheet-metal construction and having a base 21 upon which it rests. Brackets 22 and 23 are secured by bolts 24 and 25 to the front wall of the support 20 but are insulated therefrom by sheets 26 and 27 of fibre or other suitable insulating material. The bolts 24 and 25 are also suitably insulated from the support 20.

The lower bracket 22 has a recess to receive the lower end of an upright post 30, and the upper bracket 23 is provided with a cap 31 by which the post 30 may be clamped in any desired angular position. A split collar 32 is secured in vertically adjusted position by clamping bolts 33.

A supporting member, preferably formed of three parts 34, 35 and 36 (Fig. 13), is clamped to the post 30 above the collar 32 and is adapted to receive the inner or rear end of a short horizontal bar 37, which is secured between the parts 35 and 36 by clamping screws 38.

The lower welding electrode 40 is adjustably clamped in normally fixed position in the outer end of the bar 37, the parts 30, 34, 35, 36, 37 and 40 constituting the lower horn assembly and all being preferably formed of copper.

The upper horn assembly comprises a horizontal bar 42 secured in a supporting member 43 by a clamping bar 44 and clamping bolts 45. The upper welding electrode 46 is adjustably clamped to the outer end of the bar 42 by a binding screw 47 (Fig. 2) which may be tightened by a removable wrench 48. A similar clamping screw is provided for the lower electrode 40.

The supporting member 43 is preferably formed integral with and on the front side of a U-shaped plate 50 which supports the transformer which furnishes the welding current. This transformer comprises a core formed of a large number of thin laminated sheet steel plates 52 (Fig. 12) assembled in overlapping relation between the U-shaped member 50 and a pair of back plates 54 (Fig. 11). These parts are secured in assembled relation by clamping bolts 55.

A primary transformer coil 60 is supported by the core of assembled laminated plates 52, said core passing through the core opening of the coil 60 and thus holding the coil in position. The secondary of the transformer comprises a loop of laminated copper strips 62. The upper front end of the secondary is clamped to the supporting member 43 by bolts 63, and the lower end of the secondary is clamped to the bracket 23 by bolts 64.

Wires 66 and 67 lead from terminals of the transformer coil 60 to a double pole switch 68 by which the wires 66 and 67 may be connected to line wires L and L'. The switch 68 is controlled by a plunger 69 in a solenoid coil 70. When the coil 70 is energized, the switch is closed and the circuit is completed through the primary coil 60, thus energizing the secondary loop 62 to produce welding current.

Guide rolls 72 (Figs. 2 and 4) are provided on the side edges of the U-shaped plate 50 and engage guide-bars 73 mounted for limited horizontal adjustment on the side walls of the support 20 and secured in position by clamping screws 74 (Fig. 5) extending through slots 76. The bars 73 may be moved rearward toward the rolls 72 by adjusting screws 77. Similar rolls 80 (Figs. 2, 5 and 11) are mounted on the edges of each back plate 54 and engage additional guide-bars 81 (Fig. 5) secured in fixed position by clamping screws 82.

Gibs 84 (Figs. 2 and 4) engage edge portions 85 of the plate 50, and screws 86 and lock nuts 87 are provided for adjusting the gibs. Similar gibs 88 (Fig. 5) are provided for similar edge portions 89 (Fig. 11) of the back plates 54 and are adjusted by screws 90 and lock nuts 91.

The guide-rolls 72 and 80 on the plates 50 and 54, in association with the guide-bars 73 and 81 and the gibs 84 and 88, collectively constitute means by which the transformer and upper horn assembly is guided for vertical sliding movement. The lower limit of movement is determined by brackets or angle irons 92 (Fig. 4) secured on the inside faces of the side walls of the support 20.

In order to raise and lower the transformer and upper horn assembly, I secure a bracket 95 (Fig. 1) underneath the laminated transformer plates 52 and connect this bracket by a link 96 to the rear end of a lever 97, pivoted at 98 to a bracket 99 forming a part of the fixed frame of the machine. A turn buckle 100 and lock nuts 101 constitute means by which the length of the link 96 may be adjusted.

A bar 102 is slidably and adjustably secured to a swivel head 103 by a clamping screw 104, and the head 103 may be secured in angularly adjusted position on the lever 97 by a clamping screw 105. A counterweight 106 is slidable on the bar 102 and may be secured in adjusted position by a clamping screw 107.

A switch 110 is mounted on the bar 102 and is provided with an operating arm 111 having a roll 112 engaged by an upwardly and rearwardly offset extension 113 of a foot lever 114, pivoted at 115 to the bar 102. A compression spring 120 (Fig. 10) normally forces the switch arm 111 upward, and a pair of tension springs 122 are connected to draw the rearward extension 113 of the foot lever downward.

The springs 122 are connected to screws 124 extending loosely through holes in the extension 113, and the screws may be vertically adjusted in position by nuts 125.

If the screws 124 are so adjusted that the tension springs 122 overcome the compression spring 120, the pedal 114 will be held normally in the position shown in Fig. 6, with the switch 110 closed. If the screws 124 are so adjusted that the compression spring 120 overcomes the tension springs 122, the parts will normally assume the position shown in Fig. 8, with the switch 110 open.

Wires 130 and 131 (Fig. 1) are connected to the terminals of the switch 110, and the wire 130 is connected to the line wire L. The wire 131 is connected to one terminal of a cut-out switch 133, the other terminal of which is connected by a wire 134 to one terminal of the solenoid coil 70. The other terminal of the coil 70 is connected by a wire 135 to the second line wire L'. The switch 133 simply controls the supply of any current whatever to the machine and is to be opened when the machine is not in use.

It should be noted that the transformer and upper horn assembly have a straight line movement, so that the upper welding electrode 46 is moved directly toward and away from the work in a straight path, instead of swinging in the arc of a circle as has been heretofore customary.

Having described the construction of my improved welding machine, two different methods of operation will now be described.

Assuming that the switch 133 is closed and that the springs 122 are adjusted as indicated in Fig. 6, the operator presses the pedal 114 downward to raise the transformer and the upper electrode 46 to admit the work. He also holds the pedal 114 in the angular position shown in Fig. 6, thus permitting the compression spring 120 to maintain the arm 111 raised, with the solenoid circuit open.

When the work has been placed in position, the operator releases the pressure on the pedal 114, thus lowering the upper electrode 46 against the work, and at the same time or immediately thereafter he permits the springs 122 to move the pedal 114 to the position shown in Fig. 6. This forces the arm 111 downward to complete the solenoid circuit through the switch 110.

Under this method of operation, the welding current is on, except when the pedal 114 is manually displaced in the direction of the arrow $a$ (Fig. 6).

With the parts adjusted as shown in Fig. 8, the method of operation is slightly different. The switch 110 is normally open and consequently only a simple downward pressure on the foot pedal is needed to raise the transformer and the upper electrode 46 to admit the work, the solenoid circuit being already open. After the upper electrode 46 has been lowered to work-engaging position, a manual anti-clockwise movement of the pedal 114 in the direction of the arrow $b$ in Fig. 8 is necessary to close the solenoid circuit and initiate welding.

Either method of operation is equally effective, the particular method to be used depending upon the preference of the operator and also upon the nature of the work.

The amount of welding pressure may be adjusted by varying the position of the counterweight 104. The provision of direct gravity pressure, uniform for successive welds and for all vertical positions of the upper electrode, is a substantial advantage over the varying and often uneven spring pressure heretofore commonly used.

The length of the foot lever may be varied by adjusting the bar 102 in the lever 97, and the normal vertical position of the foot pedal may be varied by adjusting the turnbuckle 100. Foot travel is substantially reduced in my improved machine, with a corresponding increase in operating speed.

The straight line movement permits two or more spots, up to the capacity of the machine, to be welded at once, without limitation as to the distribution thereof.

Having thus described my invention and the advantages thereof, I do not wish to be limited to the details herein disclosed, otherwise than as set forth in the claims, but what I claim is:

1. A resistance welding machine comprising a normally fixed lower electrode, a movable upper electrode, a transformer assembled with said upper electrode to form a slidable unit, and manual means to raise said unit, return downward movement of said unit to operative position being effected by gravity.

2. A resistance welding machine comprising a normally fixed electrode, a movable electrode, a foot lever connected to move said latter electrode, a switch on said lever connected to effect opening and closing of the welding circuit, a pedal movably mounted on said lever and controlling said switch, a spring to open said switch, and stronger spring means to move said pedal to close said switch.

3. In a resistance welding machine, a welding and pressure unit comprising a welding electrode and a transformer supporting said electrode and movable therewith in said machine.

4. In a resistance welding machine, a welding and pressure unit comprising a welding electrode and a transformer supporting said electrode and movable therewith from and toward welding position in said machine, said latter movement being effected by gravity.

5. In a resistance welding machine, a welding and pressure unit comprising a welding electrode and a transformer supporting said electrode, and guides for said unit in which said unit is slidable by gravity in a downward direction.

PRESTON M. HALL.